Aug. 31, 1937. D. M. BUDD 2,091,670
COMMERCIAL AUTOMOTIVE VEHICLE WITH ANIMATED DISPLAY ADVERTISING
Filed Jan. 12, 1937
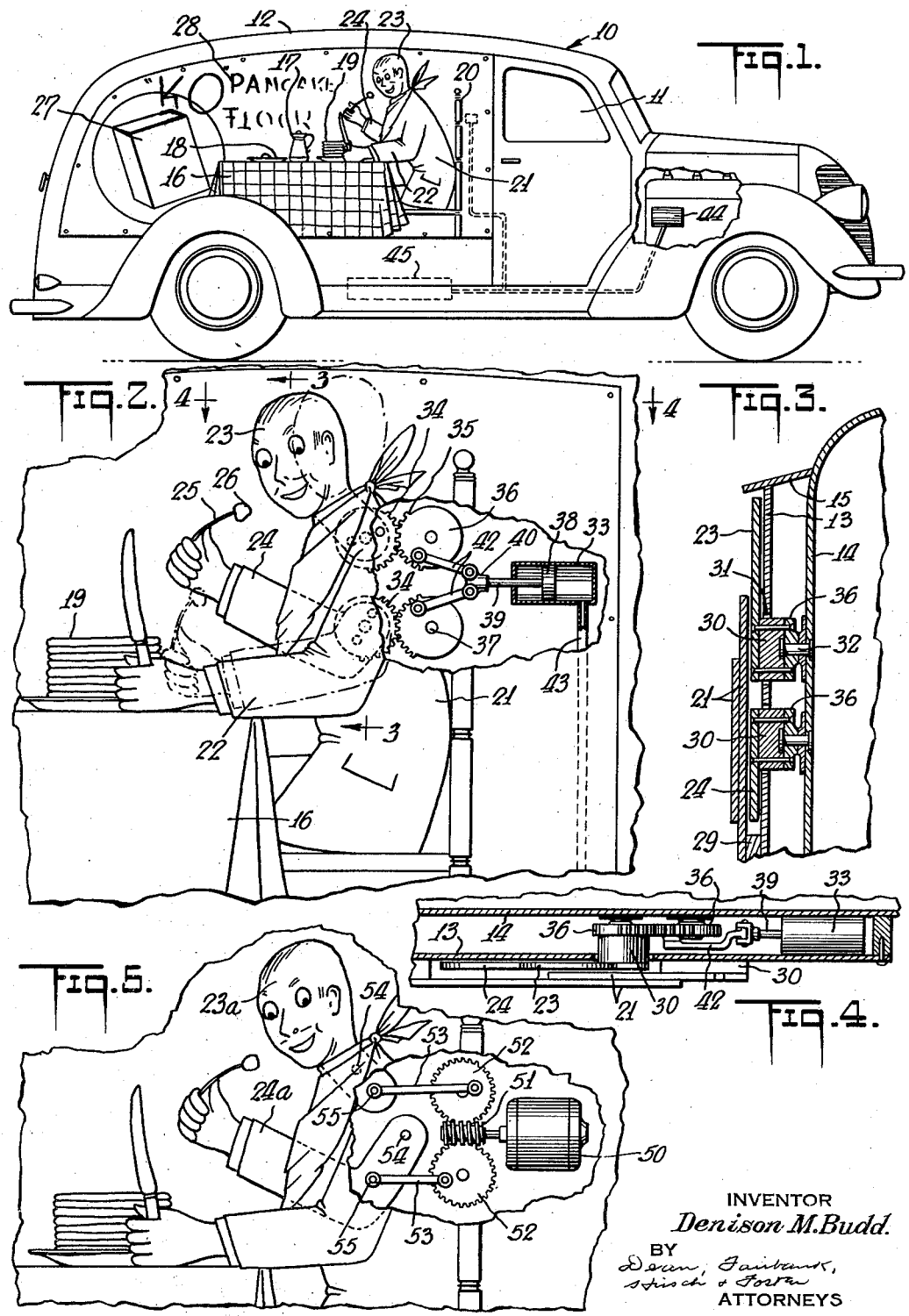
INVENTOR
Denison M. Budd
BY
Dean, Fairbank,
Hirsch & Foster
ATTORNEYS Patented Aug. 31, 1937

2,091,670

UNITED STATES PATENT OFFICE 2,091,670

COMMERCIAL AUTOMOTIVE VEHICLE WITH ANIMATED DISPLAY ADVERTISING

Denison M. Budd, North Tarrytown, N. Y.

Application January 12, 1937, Serial No. 120,163

2 Claims. (Cl. 40—139)

My present invention is concerned with improvements in animated advertising displays, and more particularly with the provision of such a display on commercial motor vehicles and with means for mounting and imparting motion to such displays.

Most modern trucks or delivery wagons or vans of the closed body type present a substantial external surface area which is capable of being utilized for advertising purposes but such potentially valuable space is now utilized quite inefficiently, if at all.

In accordance with the present invention I propose to mount an animated advertising display on the side walls of the vehicle and to utilize power derived directly or indirectly from the motor of the vehicle, for actuating the display.

A feature of the invention is the provision of a display of this type which may occupy substantially the entire side walls of a truck or the like, yet which will not reduce the available space within the storage compartment of the truck nor in any way interfere with access to such space.

Another object of the invention is to mount this display on a panel which may be attached to the exterior of the truck and which serves to conceal all of the operating mechanism.

Another object is to have an operating mechanism of extreme simplicity involving a small auxiliary motor for actuating the moving elements of the animated display. This motor may be driven by compressed air or vacuum obtained at the engine or it may be in the form of an electric motor driven from a battery which is charged from the engine.

In any event I desire that a substantially constant speed auxiliary motor for positively driving the moving parts of the display be utilized since vibratory motors are uncertain and unreliable in action. Axle drives will of necessity involve stoppage of animation whenever the truck itself stops and are inherently incapable of producing uniform frequency of operation of the moving parts of the display. When a truck is moving at high or low speeds the actuation of the moving parts is too fast or too slow to be effective.

Where, however, a suction motor or compressed air motor is employed animation of the display continues at substantially uniform speed or frequency as long as the engine is running and with an electric motor the animation may continue even when the engine is stopped.

I am aware of the fact that stationary sign boards with mechanically animated displays have heretofore been proposed. I am also aware of the fact that the sides of trucks or other commercial vehicles are used to some extent for advertising purposes.

It is believed entirely novel, however, to provide an animated display on a moving commercial vehicle using the sides of the vehicle to support this display in such fashion that there is no diminution of the storage space of the vehicle, in such fashion that all operating mechanism is concealed, and in such fashion that the animation of the animated figure is reliably effected at a substantially uniform speed or frequency.

Other and more general objects of the invention are to provide a display of this character which is above noted of extremely practical rugged construction and well suited to meet the requirements of economical manufacture and convenient installation.

The range of subject matter which may be portrayed and animated is virtually endless and not only can the trucks of individual manufacturers advantageously bear animated advertising of such manufacturer's products but a tremendous number of truck fleets, such as moving vans, express vans and common carriers, may very profitably capitalize on potentially valuable advertising space which has heretofore been of no substantial value to them.

The invention may be more fully understood from the following description in connection with the accompanying drawing wherein, Fig. 1 is a side elevational view of a truck carrying one of my improved animated displays on the side thereof, this figure illustrating diagrammatically the connections between the engine of the vehicle and the auxiliary motor which actuates the animated elements of the sign.

Fig. 2 is an enlarged side elevational view with parts of the advertising display broken away to show the operating mechanism, this view showing in dotted and full lines respectively the two positions assumed by the animated elements of the figure.

Fig. 3 is an enlarged transverse detail section on the line 3—3 of Fig. 2.

Fig. 4 is a sectional plan view on the line 4—4 of Fig. 2 and,

Fig. 5 is a view similar to Fig. 2 but illustrating a slightly modified type of drive for the moving parts of the animated display.

Referring with more particularity first to Figs. 1 to 4 of the drawing I have used the reference numeral 10 to designate generally an automotive vehicle in the form of a truck having the usual cab 11 for the driver and the usual enclosed body 12, the side walls of which are, in accordance with my invention, used for carrying an animated advertising display.

In order that the storage space within the truck body may be in no manner encumbered by the display or by the mounting or actuating means therefor, the entire display unit is preferably mounted upon or within a panel 13. This panel 13 follows the contour of the space which is to be used for an advertising display and preferably follows the contour of the side walls of the truck body. The panel is supported in spaced relationship to the side wall 14 of the truck by strips 15 projecting inwardly from the marginal edges of the panel and secured in any suitable fashion (not shown) to the panel and the body.

It is within this space between the panel and the body that I preferably mount the driving motor for the parts of the sign which are to be actuated and it is also within this space that I mount the power transmitting, motion translating connections between the motor and the driven elements of the display. It will be understood that the nature of the display itself may assume an infinite variety of forms and that the type of display herein illustrated represents merely one of innumerable embodiments of the invention.

The display herein illustrated includes a simulation 16 of a dining table upon which are arranged simulations 18 and 17 of various dishes and pitchers, one of the dishes bearing a simulation of food such for instance as a stack of pancakes 19. Seated upon the simulation 20 of a chair is a figure, the body portion 21 of which is stationary and one arm portion 22 of which is likewise stationary. The head 23 of the figure and one arm 24 thereof are movable and when oscillated produce a realistic simulation of a man rapidly consuming the pancakes. The movable arm 24 is depicted as carrying a fork 25 upon which there is displayed food 26 and the combined movement of the head section 23 and the arm section 24 gives the impression that the gentleman at the table is consuming the pancakes with great expedition and gusto inasmuch as he appears to be transferring them from the plate to his interior most rapidly and enjoyably.

In the form of the invention illustrated the panel 13 may directly carry (or have painted thereon) pictorial advertising such as 27 and printed advertising such as 28. The section of the display representing the table and its contents, the figure 21 and the chair upon which the figure is seated are preferably spaced from the panel and are secured thereto by suitable spacer blocks 29. The concealed portions of the head section 23 and arm section 24 carry hubs 30 which project through openings 31 in the panel and are secured upon suitable pivots 32 projecting outwardly from the body of the car.

Any suitable manner of imparting an alterating rotary movement to the hubs to thereby rock or oscillate the sections 23 and 24 in relatively opposite directions may be employed. The actuating mechanism herein illustrated is therefore merely typical of many others which might be used.

It may also be reiterated that the particular nature of the display and consequently the particular movements which may be imparted to the animated elements thereof may be widely varied with consequent alterations in the power transmitting and motion translating mechanism which connects the animated sections of the display with a motor such for instance as the compressed air or suction motor 33 shown in Fig. 2.

As illustrated the hubs 30 are provided with outwardly extending toothed sectors 34 meshing with corresponding teeth 35 on a pair of disks 36, the disks 36 turning on shafts 37 secured in any suitable fashion to the side walls of the truck.

The motor 33 which has been shown in extremely diagrammatic form may include a cylinder 38ª for piston 38 having a piston rod 39 projecting through one end of the cylinder and connected by a cross head 40 with a pair of links or cranks 42 respectively connected to the disks 36 near the edges of the latter. As the piston 38 moves back and forth, cranks 42 will serve to alternately rotate the disks 36 in respectively opposite directions and the required oscillating movement of arm section 24 and head section 23 will be effected.

There are many compressed air or vacuum motors in which a piston is moved back and forth in a cylinder by superatmospheric or subatmospheric pressure applied alternately to opposite sides of the piston and no attempt to illustrate the details of the motor has been made. Many such motors are illustrated in patents issued to Trico Products Corporation of Buffalo, New York. The motor is mounted by any convenient or conventional means in the space between the panel 13 and the truck body 11.

I have diagrammatically illustrated a length of flexible tubing 43 extending from the motor to a point adjacent the engine of the truck. Here it may be connected either to a compressor 44 operated from the engine or directly to the intake manifold of the car and where compressed air is used an auxiliary storage tank 45 mounted underneath the car is perfectly employed, this tank storing enought compressed air to permit the air motor to run for a short while even when the engine of the car is stopped.

Fig. 5 shows an arrangement in which an electric motor 50 operates through a worm 51 to drive a pair of gears 52. Connected eccentrically of these gears is a pair of cranks 53. The head section 23ª and arm section 24ª corresponding to the sections 23 and 24 of Fig. 1 have their concealed ends fixed upon pivots 54 carried by the body of the truck and the two cranks 53 are likewise pivoted to the sections 23ª and 24ª as indicated at 55.

In this form of the invention the motor and the gears and the cranks will all be confined between the panel 13 and the truck body and concealed by the panel.

The motor may be driven from the ordinary battery of the car or from an auxiliary battery, this battery being charged by the standard generator of the car.

With all forms of the invention rapidity of movement of the animated display will be substantially uniform as long as the engine is running and regardless of the speed of the truck the animated sections will not be speeded up so as to become a mere optional blur when the truck is going rapidly nor will they be slowed down sufficiently to be optically ineffective when the truck is driven very slowly. It is apparent that with most displays a certain uniformity of speed or frequency of operation is essential if the intriguing character and the desired spirit of the advertising message is to be maintained.

It will thus be seen that I have provided a display apparatus subject to a wide variety of design and structure yet characterized by important features of (1) actuation of the display from an auxiliary motor rather than from the axle or vibrator so that uniform rythmic movement of the display will be insured at all times, (2) that the driving power for the auxiliary motor is derived either directly or indirectly from the engine of the truck, (3) the concealment of the operating mechanism for the display without in any way reducing the available cargo space of the truck body or in any way impeding the entrance to such space.

It will, of course, be understood that the display is always arranged so that it will not interfere with the doors through which access is gained to the cargo space of the truck. In the illustrated embodiment of the invention the display is arranged at the side of the truck and the door to the cargo space is at the rear of the truck. Where doors are arranged in the side walls displays will be arranged to avoid them and where a truck has no back door the back wall of the truck affords a good place for the displays.

While I have not illustrated them the pivoted moving members are preferably counterbalanced in such a fashion that they impose a minimum load on the motor which actuates them. This, because it is desirous to use an extremely small light duty actuating motor which can be mounted between the panel and the truck wall.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

I claim:

1. The combination with a commercial motor vehicle of the closed body type in which the body provides a cargo space, of an animated display sign mounted on an outside wall of the body, said sign including movable elements, means for actuating said elements with substantially uniform speed and frequency regardless of the speed of the vehicle or the condition of the road over which the vehicle is travelling, said actuating means being concealed by the display and being outside of the cargo space of the vehicle and deriving power from the motor.

2. The combination with a motor truck of an animated display sign mounted on the wall of the truck, means for actuating said display at a substantially uniform speed or frequency independently of the speed of the vehicle or the condition of the road, said display including a panel spaced from the wall of the truck and bearing the display, the display including movable elements disposed exteriorly of the panel and actuating means for said movable element disposed between the panel and the side wall of the truck.

DENISON M. BUDD.